(12) United States Patent
Nugue et al.

(10) Patent No.: US 8,403,587 B2
(45) Date of Patent: Mar. 26, 2013

(54) CONNECTION SYSTEMS INTENDED FOR EQUIPPING PLATES, ESPECIALLY GLASS PLATES, FOR THE PURPOSE OF FASTENING THEM, AND THE PLATES THUS EQUIPPED

(75) Inventors: Jean-Clement Nugue, Lamorlaye (FR); Fabien Levasseur, Compiegne (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 12/301,621

(22) PCT Filed: May 21, 2007

(86) PCT No.: PCT/FR2007/051305
§ 371 (c)(1),
(2), (4) Date: Nov. 24, 2008

(87) PCT Pub. No.: WO2007/135335
PCT Pub. Date: Nov. 29, 2007

(65) Prior Publication Data
US 2009/0142131 A1    Jun. 4, 2009

(30) Foreign Application Priority Data

May 22, 2006 (FR) .................................. 06 51863
Dec. 12, 2006 (FR) .................................. 06 55440

(51) Int. Cl.
*F16B 5/12* (2006.01)
(52) U.S. Cl. .................. 403/252; 403/242; 403/381
(58) Field of Classification Search .............. 403/170, 403/178, 179, 176, 246, 253, 252, 381, 254, 403/242; 52/204.57, 204.58, 204.62, 204.7, 52/779
See application file for complete search history.

(56) References Cited

U.S. PATENT DOCUMENTS

| | | | | |
|---|---|---|---|---|
| 2,142,305 | A * | 1/1939 | Davis | 52/592.1 |
| 2,898,647 | A * | 8/1959 | Bush et al. | 52/204.595 |
| 3,090,086 | A * | 5/1963 | Fata | 403/381 |
| 3,160,249 | A * | 12/1964 | Pavlecka | 52/586.2 |
| 3,309,123 | A * | 3/1967 | Edwards | 264/80 |
| 3,416,275 | A * | 12/1968 | Van Loghem et al. | 52/282.3 |
| 4,648,226 | A * | 3/1987 | Manon | 52/308 |
| 4,712,942 | A * | 12/1987 | Brown | 403/174 |
| 4,730,428 | A * | 3/1988 | Head et al. | 52/309.11 |
| 5,531,535 | A * | 7/1996 | Lind | 403/297 |
| 6,186,691 | B1 * | 2/2001 | Rudolf-Bauer | 403/31 |
| 7,152,383 | B1 * | 12/2006 | Wilkinson et al. | 52/581 |
| 7,451,535 | B2 * | 11/2008 | Wells et al. | 29/412 |

(Continued)

FOREIGN PATENT DOCUMENTS

| | | |
|---|---|---|
| DE | 195 42 040 A1 | 6/1996 |
| DE | 20302370 U1 * | 5/2003 |
| EP | 1 241 314 | 9/2002 |
| FR | 1 187 160 | 9/1959 |
| FR | 2 378 935 | 8/1978 |

*Primary Examiner* — Joshua Kennedy
(74) *Attorney, Agent, or Firm* — Oblon, Spivak, McClelland, Maier & Neustadt, L.L.P.

(57) ABSTRACT

A connecting system configured to secure at least one cavity including curved and retaining walls and positioned on a surface portion located on an edge of a substrate made of a fragile material of glass type and a support member. The connecting system includes a shoe including at least one appendage projecting from at least one of faces of the shoe, the appendage having a profile that complements the profile made on the surface portion situated on the edge of the substrate.

16 Claims, 4 Drawing Sheets

U.S. PATENT DOCUMENTS 7,497,639 B2 * 3/2009 Lebot et al. .................. 403/277
7,686,552 B2 * 3/2010 Bohnet et al. .................. 411/82
2008/0236086 A1 * 10/2008 Huang ........................... 52/508
2009/0145063 A1 * 6/2009 Nugue et al. ............... 52/204.58

* cited by examiner

CONNECTION SYSTEMS INTENDED FOR EQUIPPING PLATES, ESPECIALLY GLASS PLATES, FOR THE PURPOSE OF FASTENING THEM, AND THE PLATES THUS EQUIPPED

CROSS-REFERENCE TO RELATED APPLICATIONS

The present application is the U.S. counterpart of WO 2007/135335 and claims priority to French application no. 0651863 filed on May 22, 2006 and French application no. 0655440 filed on Dec. 12, 2006, the entire contents of each of which are hereby incorporated herein by reference.

BACKGROUND

1. Field

The present invention relates to sheets, particularly sheets of fragile material of the glass type, equipped for being fixed to supports or to be joined together using joining elements.

2. Description of the Related Art

Such sheets are intended in particular for producing walls or fixtures and fittings, of a facade element or an internal arrangement, which are made up of substrates, particularly transparent substrates, for example glass substrates.

To these ends, these sheets have therefore to have holes at the fixing and/or connecting points. They may be reinforced, particularly using thermal or chemical tempering, in order to obtain the required mechanical strength (and the required thermal resistance if necessary). The holes have therefore to be made before the heat treatment operation.

Document DE 195 42 040 discloses a sheet of glass which, at its edge face, has a peripheral slot, this slot being intended to accept a joint, it being possible for the joint to be forcibly inserted into the slot or bonded or extruded into said slot.

The main disadvantage with this type of sheet lies, in particular, in the fact that the connection between the slot and its joint requires the use of an external agent or an external action.

In the case of adhesive bonding, the adhesive chosen needs to be applied beforehand to the faces of the joint and/or of the slot that are to be bonded together, then the faces of the joint and/or of the slot are brought into contact, the assembly not actually being mechanically secure until after a given curing time has elapsed.

This adhesive-bonding technique is dependent upon the time taken for the adhesive to cure, and upon the integrity of the adhesive over time, it being possible for the mechanical connection between the joint and its slot to deteriorate over time as a result in particular of aging of the adhesive (under the action of UV radiation for example) or as a result of inappropriate mechanical or chemical demands, of the detergent or solvent type, etc., on the joint.

German utility model DE 203 02 370 describes a connecting system for glass sheets, this connecting system allowing connection to be made using a joining element collaborating through retaining shapes made on the edges of the sheets of glass. These dovetail retaining shapes are inappropriate if, as is often the case, the sheet has to undergo a heat treatment in order to improve its mechanical properties, this typically being a tempering operation. Stress concentrations are then created in the angular parts and there is a risk that these stresses will be released, destroying the sheet of glass.

When the joint or connecting system is "force fitted" into the slot without any special retaining appendages, insertion is governed by the mechanical properties of the material of which the joint or connecting system is made, particularly the elastic deformation properties. Provided that the joint or connecting system is not mechanically stressed, it will remain in place in its slot, but if, as a result of aging of the material, mechanical stresses that are inappropriate in terms of their direction and/or in terms of their intensity are applied, a gap may open and cause the joint or connecting system to escape from its slot. In addition, it is found that "force-fitting" a part of the joint or connecting system type is not the optimum way of inserting such a component when the latter is supposed to be able to transmit loads.

SUMMARY

The present invention proposes a connecting system allowing at least one cavity, preferably positioned on a surface portion situated on the edge or edge face of a substrate to be secured to a support member without displaying the disadvantages of the prior art.

To these ends, the connecting system designed to secure at least one cavity having curved and retaining walls and positioned on a surface portion located on the edge of a glass substrate and a support member, characterized in that it comprises a shoe equipped with at least one appendage projecting from at least one of the faces of said shoe, said appendage having a profile that complements the profile made on the surface portion situated on the edge of said substrate.

In some preferred embodiments of the invention, recourse may also possibly be had to one and/or another of the following arrangements:
  the shoe is T-shaped
  the shoe is L-shaped
  the shoe is U-shaped
  the shoe is made of plastic, preferably of Nylon-6,6,
  the shoe is made from a pultrusion of plastic fibers and reinforcing fibers,
  the shoe is produced by molding or injection molding a plastic,
  the appendage has projecting parts of convex profile that complement the profile of the concave faces made in said cavity,
  the appendage has parts capable of flexing elastically or even plastically inwards so as to allow said appendage to be fitted into the corresponding cavity of said substrate,
  collaboration between the shoe and the cavity is designed in such a way as to ensure that said connecting means is automatically locked into the cavity,
  a wetting agent is interposed at the interface between the side wall of the cavity and the connecting means in order to improve the surface condition.

Within the meaning of the invention, an "edge" is defined as being the long narrow face of a large sized element.

The present invention also relates to a sheet of mineral or organic glass comprising, on at least one of its faces, preferably at its edge, a cavity intended to accept at least one connecting system as defined hereinabove. It also relates to a sheet such as this equipped with its connecting means of which there may be one or more. It also relates to a sheet which has been equipped with its one or more connecting means and in which the or each connecting means allows for connection with a support member, it being possible for this support to be another sheet.

As indicated hereinabove, the fragile material of which these sheets is made is generally tempered glass, or, more generally, a glass substrate which can undergo a heat treatment or chemical treatment, particularly a tempering, a toughening, an annealing, a bending operation, or alternatively, a glass which is mechanically strengthened, after the cavities have been made.

The present invention also relates to an assembled assembly or assembly for assembly comprising at least one sheet of fragile material of the glass type as defined hereinabove.

In particular, an assembly such as this constitutes a part of fixtures and fittings, a partition or wall of a piece of furniture, of a room, of a shower cubicle, a shelf, for example a refrigerator shelf, shop furniture, display cabinets, doors, shop windows.

An assembly such as this may constitute a double glazing or even a triple glazing, each of the substrates forming this assembly being assembled and joined together by joining elements.

BRIEF DESCRIPTION OF THE DRAWINGS

In order to provide a better illustration of the subject matter of the present invention, various particular embodiments thereof will be described hereinbelow by way of nonlimiting indication with reference to the attached drawings in which.

DETAILED DESCRIPTION

Figure 4:
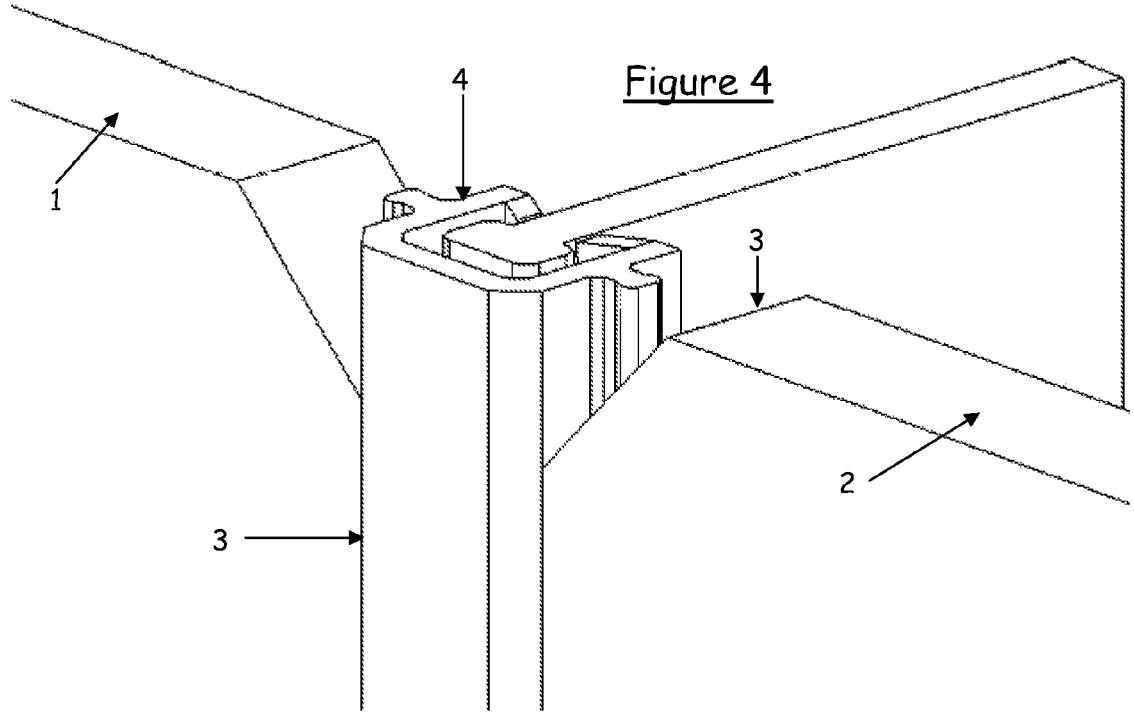
FIG. 4 is a perspective view illustrating the joining-together of two substrates using a connecting system according to the invention.
Figure 5:
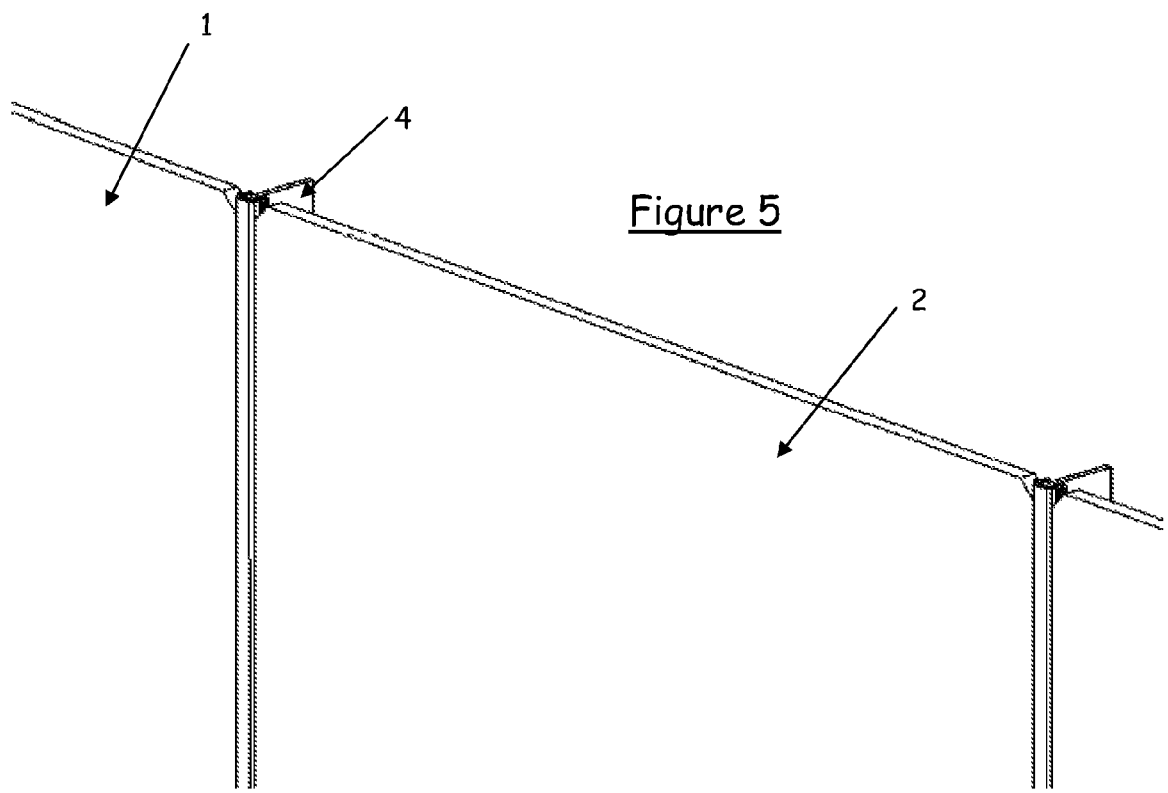
FIG. 5 is a perspective view illustrating the joining-together of two substrates using the connecting system according to FIG. 2.

FIGS. 4 and 5 depict monolithic glass panes 1 and 2 which are provided on at least one surface portion, and near their edge 3, with at least one slot which was made before the glass pane was tempered, parallel to the main faces thereof and along the edge.

In a conventional way, solid angles of intersection between the edge-forming face and the two main faces of the glass pane are removed in the customary way, for example by chamfering.

The cross section of the slot is rectangular in a first part near these remaining surfaces, then is of rounded shape in a second part that forms the bottom of the slot. However, its bottom will be very well rounded, in order to prevent any stress raisers in the corners and minimize the effect of the cutting of the slot.

A series of cutters with appropriate profiles and tooth shapes (roughing cutter, semi-finishing cutter, finishing cutter) is used to produce a blind cavity inside this slot. Of course, the cross section of the cavities may vary, these being circular or oblong in particular, according to the intended application.

In an alternative way of producing the slot, this slot is obtained using abrasive disks or grinding wheels. These abrasive tools are of course rotationally driven and positioned on a pivotable or inclinable head. Thus, by inclining the tool with respect to the normal to the side or edge of the glass substrate and by combining this movement with a feed movement, a slot or the desired profile can be obtained, after a number of machining passes.

The cavity is delimited by a flat bottom perpendicular to the main faces of the sheet of glass, and by a side wall connected to the bottom by a region of curved and retaining profile, particularly of concave shape, with the concave face facing towards the inside of the cavity and exhibiting axial symmetry, followed by a short oblong region, and then opening onto the remaining surfaces via a frustoconical region that widens towards the outside. This region thus constitutes, together with the parts adjacent to the regions, a catching or retaining bead the purpose of which is explained later on.

If necessary, the slot may also have a cross section with undercut, if the corresponding manufacturing possibilities are available and the total thickness of the sheet is sufficient.

The slot made on the edge 3 of each substrate is intended to accept a connecting system 4 obtained by molding a plastic such as PVDF (poly(vinylidene fluoride)) or Nylon-6,6, for example, or by an operation of pultrusion of reinforcing fibers (glass fibers) and plastic fibers.

Figure 3:
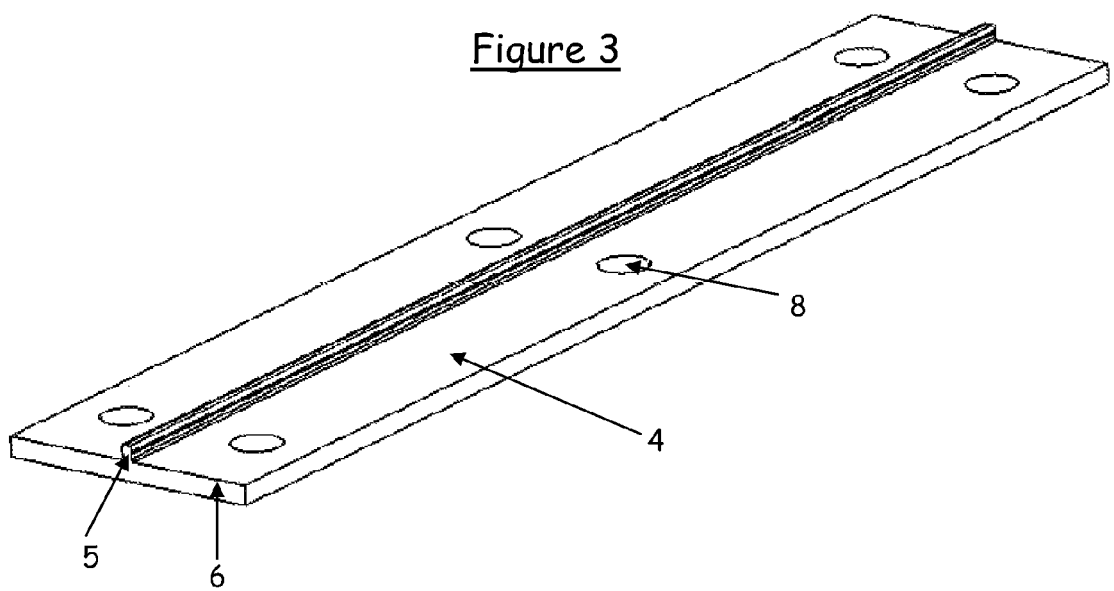
FIG. 3 is a perspective view of an alternative form of embodiment of a T-shaped embodiment.

As can best be seen in FIGS. 3, 4 and 5, the connecting system 4 comprises a projecting appendage 5 connected to a more or less flat shoe 6. This connecting system 4 is either one-piece or made up of several elements. It is elastically or even plastically deformable so as to allow it to be inserted into the slot.

The external face of the appendage 5 is connected to the bottom by a curved region the shape of which allows it to hug that of the concave region of the slot. The curved region is extended by a low wall which is intended to bear against the oblong region delimiting the slot, ending, after a step inwards, in another oblong region.

Depending on the application, and particularly in the application at which this example is aimed, it may be important to make the hole and its insert invisible from the side facing the user. To do this, a wetting agent is interposed at the interface between the internal side wall of the slot and the external wall of the connecting system 4 in order to improve the surface condition, this wetting agent being silicone for example, or a wetting agent that has this property.

Figure 1:
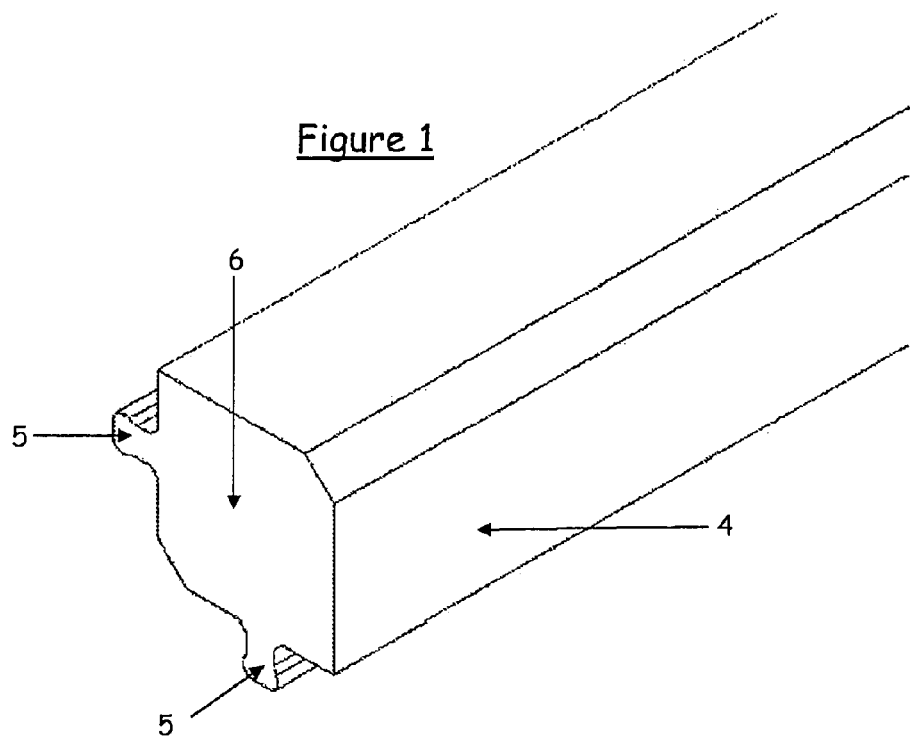
FIG. 1 is a perspective view of a connecting system according to the invention, produced in an L-shape.
Figure 2:
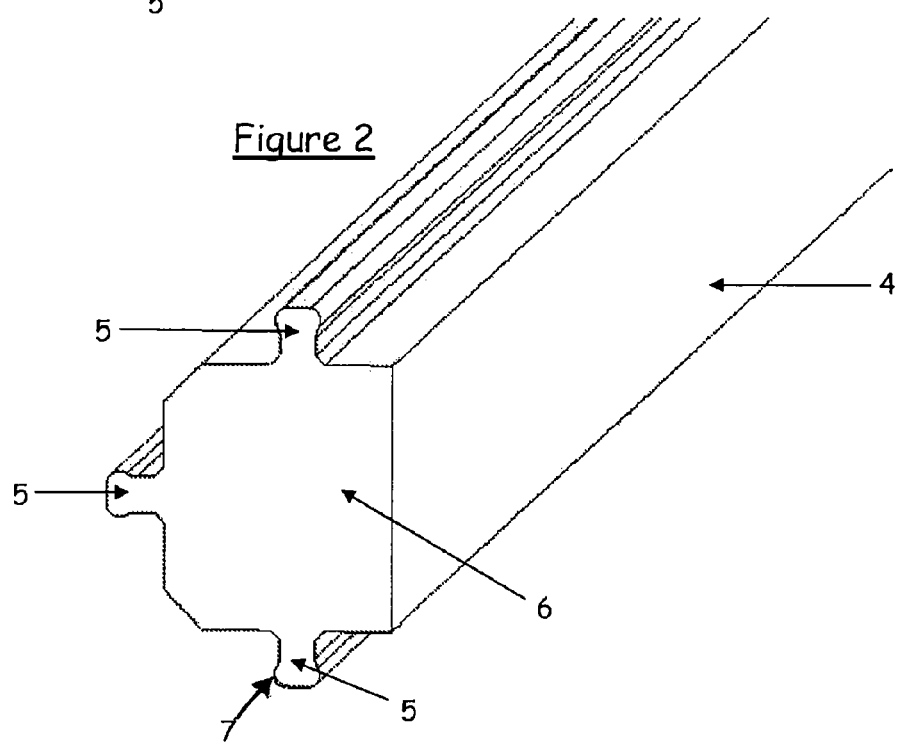
FIG. 2 is a perspective view of a connecting system according to the invention, produced in a T-shape.

According to a preferred embodiment (depicted in FIGS. 1 and 2 for example), the connecting system 4 has a shoe-shaped part of parallelepipedal overall shape, at least one of the faces of which has a projecting appendage 5. Depending on the number of appendages, it is possible for example to have L-shaped, T-shaped, U-shaped, Y-shaped, etc. connecting systems or, more generally, connecting systems with any cross section produced from a succession of simple or straight shapes as listed above and having, on at least one of their faces, at least one appendage 5 allowing for connection to the edge of a substrate. It is also possible, as in the alternative form depicted in FIG. 4, to have a connecting system 4 of U-shaped overall cross section in which the lateral parts of the U are provided with appendages 5 for securing to the edges of the substrates and in which the central part of the U allows another substrate or wall or partition to be mounted by force-fitting or the like.

The part forming the appendage 5 has projecting parts 7 of convex profile that complement the profile of the concave faces made in the slot.

These convex parts 7 are produced as one piece with the shoe and are elastically deformable.

Furthermore, it is also possible to conceive of prefabricating the shoe separately from the convex parts 7 and assembling them later (by clipping, bonding, fusing). That would possibly have the advantage that the shoe and the convex parts could be made of different materials (and in particular also have different hardnesses).

In order to mount the connecting system 4 in the slot in the sheet 1 (the glazing or the like), all that is required is for the appendage to be "forced" into the slot in the correct position. The convex parts 7 are then elastically deformed.

As an alternative (not depicted in the figures), this connecting system may collaborate with a rod or any other type of similar component designed to allow it to collaborate with another connecting system intended to collaborate with another cavity of another sheet in order in this way to form elements (fixtures and fittings or the like).

As an alternative, such as the connecting system depicted in FIG. 3 for example, the system is in the form of a plate or sole designed to be connected to the ground or to any other bearing structure via holes 8 through which fasteners can be inserted, or alternatively, the connecting system may in general consist of any transmission allowing a sheet of fragile material to be connected to a support. Thus, this transmission may involve a ball joint, possibly extended by a rod, an articulation, a box, etc.

Figure 6:
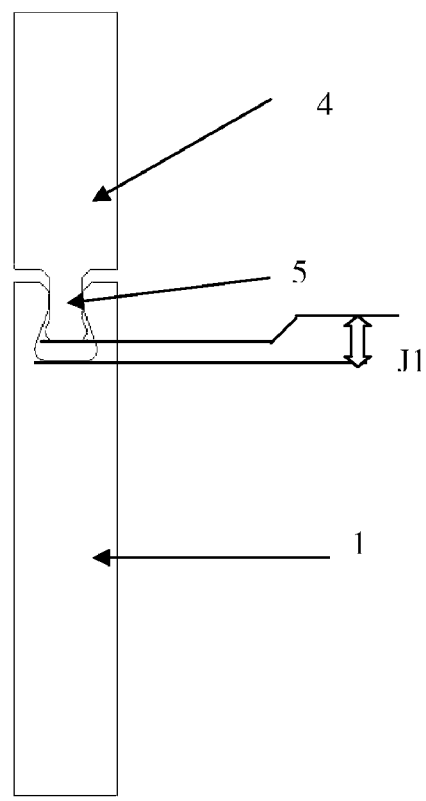
FIG. 6 is a view in cross section illustrating the joining-together of a substrate and a connecting system according to the invention, this system of joining having the property of allowing for axial expansion between the substrate and the connecting system.

According to yet another alternative form of embodiment illustrated in FIG. 6, the assembly between a substrate 1 and a connecting system 4 (possibly secured to another substrate 2) may be performed by providing or allowing an expansion clearance between the connecting system 4 and the substrate 1. In order to do this, the slot produced in the edge 3 of the substrate 1 is designed to have a characteristic dimension (in this instance a depth in particular) significantly larger than the characteristic dimension of the appendage 5 so as to allow an axial movement by j1 of the appendage 5 in the slot in one direction or the other. This axial movement of the system 4 and of its appendage 5 with respect to the substrate 1 may be the result of thermal expansion phenomena or of mechanical play resulting from the assembly of the substrates 1, 2.

It will be readily appreciated that this clearance j1 can also be allowed not between the connecting system 4 and the substrate 1 or 2 but more generally with a transmission constituting an intermediate part or intermediate collection of parts between a connecting system and at least one substrate.

Figure 7:
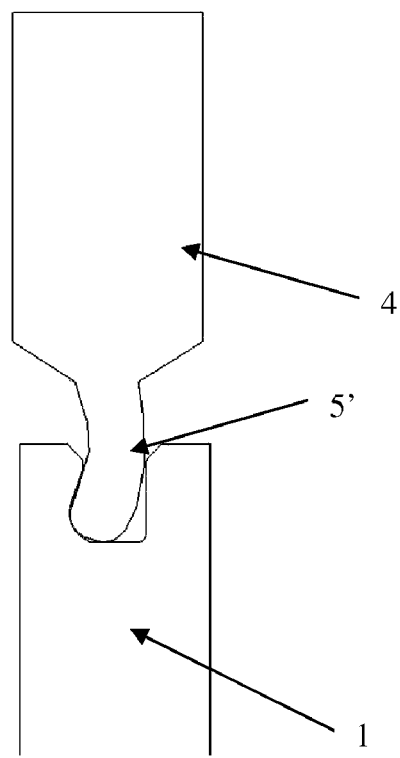
FIG. 7 is a view in cross section of an alternative form of embodiment of an alternative form of embodiment of a connecting system according to the invention.

According to yet another alternative form of embodiment shown in FIG. 7, it can be seen that the appendage 5' of the connecting system 4 is asymmetric. This asymmetric profile is particularly well suited to facilitating assembly between a substrate 1 or 2 and a connecting system 4 not by nesting the connecting system 4 via one of its ends in the slot made in the edge of the glazing and then sliding the appendage 5 along the slot but by positioning the appendage 5' facing the slot in its final position and then performing a slight rotational movement to allow the appendage 5' to engage in the slot. This way of mounting the connecting system 4 bearing its asymmetric appendage 5' in the slot 3 is similar to the way in which two sheets of laminate flooring are clipped together, the two parts locking together once the substrate 1 and the connecting system are positioned in the same plane (this is the assembly shown in FIG. 7).

The sheets of glass which have undergone a heat treatment or chemical treatment (for example a tempering operation) are prepared as follows: to begin with, the sheets are cut from non-tempered glass; the cavities are machined at the required locations (generally at least at one surface portion of the edge of said sheet), the heat treatment or chemical treatment is then performed (in this example, it is a tempering operation) on the sheets. The concave region of the side walls delimiting the cavities spreads the stresses which arise within the glass during the tempering. In particular, the profile of this concave region in terms of the choice of radius of curvature makes it possible to ensure that tempering can be performed without causing the glass to break in this region, thus avoiding having to scrap sheets.

Next, the connecting systems are introduced into the cavities. As has already been stated, this insertion of the joining elements is very easy because of the elasticity or even the plasticity thereof. The sheets may be delivered already equipped with their joining elements.

In general, the connecting system makes it possible to perform assembly between a frame or a bearing structure in general, and a sheet.

Thus, for example, the connecting system can be used to assemble multiple glazing. This may be triple glazing (of course, a variant for double glazing can be readily deduced from the aforementioned one), in which case the joining element is a triple one, having a central element and two lateral elements collaborating respectively with that same number of cavities made in the edges of the glazings. The choice of material of which to make the connecting system is made in such a way as to give the assembly the required mechanical strength once it has been assembled and, if necessary, to afford sealing if the multiple glazing is assembled incorporating a gas between the glazings. If need be, the joining elements are sealed against atmospheric pressure since the space between the glazings may be kept at a reduced pressure.

The invention as described hereinabove offers numerous advantages:
- the connection is relatively insensitive to manufacturing tolerances,
- the connection can be disconnected and is able to withstand relatively high mechanical loads.

Of course the embodiment described hereinabove is not in any way limiting and may give rise to any desirable modifications without thereby departing from the scope of the invention.

The invention claimed is:

1. A connecting system, comprising:
   a glass substrate including at least one cavity having curved and retaining walls, the cavity extending longitudinally along a surface portion located on an edge of the glass substrate;
   a shoe including at least one appendage having opposing first and second sides, the at least one appendage projecting from at least one face of the shoe, the at least one face extending outwardly from each of the first and second sides of the at least one appendage such that the at least one face is wider than a width of the at least one appendage, and the at least one appendage having a profile that complements a profile of the cavity on the edge of the glass substrate,
   wherein collaboration between the shoe and the cavity ensures that the connecting system is automatically locked into the cavity,
   wherein the cavity is delimited by a curved and retaining region of concave profile, a concave face thereof facing inward, and
   wherein the at least one appendage is elastically flexible inwards such that the at least one appendage can fit into the cavity of the glass substrate by force in a direction that is transverse to the longitudinal extension of the cavity.

2. The connecting system as claimed in claim 1, wherein the shoe is T-shaped.

3. The connecting system as claimed in claim 1, wherein the shoe is L-shaped.

4. The connecting system as claimed in claim 1, wherein the shoe is U-shaped.

5. The connecting system as claimed in claim 1, wherein the shoe comprises one of plastic and Nylon 6,6.

6. The connecting system as claimed in claim 1, wherein the shoe comprises a pultrusion of plastic fibers and reinforcing fibers.

7. The connecting system as claimed in claim 1, wherein the shoe is produced by molding or injection molding a plastic.

8. The connecting system as claimed in claim 1, wherein the profile of the at least one appendage includes convex projecting parts that complement concave faces of the profile of the cavity.

9. The connecting system as claimed in claim 1, wherein the at least one appendage has an asymmetric profile.

10. The connecting system as claimed in claim 1, further comprising a wetting agent interposed at an interface between a side wall of the cavity and the shoe to improve surface condition.

11. The connecting system as claimed in claim 1, wherein the glass substrate is a sheet of mineral or organic.

12. The connecting system as claimed in claim 1, wherein the glass substrate is tempered glass, toughened glass, annealed sheet glass, or mechanically strengthened glass.

13. The connecting system as claimed in claim 1, wherein the at least one appendage is symmetrical about a plane and the at least one face extends substantially perpendicularly to the plane of symmetry of the at least one appendage.

14. The connecting system as claimed in claim 1, wherein the shoe further includes a slotted opening in a side thereof, the slotted opening configured to accommodate a partition.

15. A connecting system, comprising:
   a glass substrate having a cavity that extend longitudinally along an edge of the glass substrate;
   a shoe including at least one appendage projecting from a face of the shoe, a width of the at least one appendage being narrower than a corresponding width of the face of the shoe,
   wherein collaboration between the shoe and the cavity of the glass substrate ensures that the connecting system is automatically locked into the cavity,
   wherein the cavity is delimited by a curved and retaining region of concave profile, a concave face thereof facing inward, and
   wherein the at least one appendage is elastically flexible inwards such that the at least one appendage can fit into the cavity of the glass substrate by force in a direction that is transverse to the longitudinal extension of the cavity.

16. The connecting system as claimed in claim 15, wherein the shoe further includes a slotted opening in a side thereof, the slotted opening configured to accommodate a partition.

\* \* \* \* \*